(12) United States Patent
Chase

(10) Patent No.: US 10,613,545 B2
(45) Date of Patent: Apr. 7, 2020

(54) PASSIVE INFRA-RED GUIDANCE SYSTEM

(71) Applicant: Arnold Chase, West Hartford, CT (US)

(72) Inventor: Arnold Chase, West Hartford, CT (US)

(*) Notice: Subject to any disclaimer, the term of this patent is extended or adjusted under 35 U.S.C. 154(b) by 0 days.

(21) Appl. No.: 16/356,043

(22) Filed: Mar. 18, 2019

(65) Prior Publication Data
US 2019/0346855 A1 Nov. 14, 2019

Related U.S. Application Data

(60) Provisional application No. 62/670,209, filed on May 11, 2018.

(51) Int. Cl.
*G05D 1/02* (2006.01)
*G05D 1/00* (2006.01)
(Continued)

(52) U.S. Cl.
CPC ........... *G05D 1/0246* (2013.01); *B60K 35/00* (2013.01); *B60W 10/04* (2013.01); *B60W 10/18* (2013.01); *B60W 10/20* (2013.01); *G05D 1/0088* (2013.01); *G05D 1/0223* (2013.01); *G05D 1/0242* (2013.01); *B60K 2370/155* (2019.05);
(Continued)

(58) Field of Classification Search
CPC ............. G06K 9/00798; G05D 1/0088; G05D 2201/0212; B60W 30/12; B60W 30/10
See application file for complete search history.

(56) References Cited

U.S. PATENT DOCUMENTS 6,037,860 A   3/2000   Zander et al.
6,151,539 A   11/2000  Bergholz et al.
(Continued)

FOREIGN PATENT DOCUMENTS

| EP | 0640903 A1 | 3/1995 | |
|----|----|----|----|
| WO | 2014198551 A1 | 12/2014 | |
| WO | WO-2017184061 A1 * | 10/2017 | ............ B60W 30/12 |

OTHER PUBLICATIONS

International Search Report for PCT Application No. PCT/US2019/027594 dated May 21, 2019.
(Continued)

*Primary Examiner* — Dale Moyer
(74) *Attorney, Agent, or Firm* — McCormick, Paulding & Huber PLLC

(57) ABSTRACT

A passive infra-red guidance system and method for augmenting operation of an autonomous vehicle on a roadway includes at least one forward-looking infra-red imaging sensor mounted on the vehicle in operative communication with an image processor tied into the vehicle's operational system. The system determines the left and right edges of the roadway using thermal imaging, and then determines the centerline of the travel lane in which the vehicle is travelling based on the determined left and right edges of the roadway. The system then compares the determined centerline of the travel lane with the actual position of the vehicle and identifies any adjustment needed for the vehicle's position based on the comparison. The left and right edge determination may comprise identifying a difference between a thermal signature representative of the roadway and a thermal signature representative of a non-roadway portion that is located proximate to the roadway portion.

14 Claims, 7 Drawing Sheets

(51) Int. Cl.
    *B60K 35/00*     (2006.01)
    *B60W 10/18*     (2012.01)
    *B60W 10/20*     (2006.01)
    *B60W 10/04*     (2006.01)
    *G06K 9/00*     (2006.01)

(52) U.S. Cl.
    CPC .. *B60K 2370/334* (2019.05); *B60W 2550/306* (2013.01); *G05D 2201/0213* (2013.01); *G06K 9/00798* (2013.01)

(56) References Cited

U.S. PATENT DOCUMENTS

| | | | |
|---|---|---|---|
| 6,327,522 | B1 | 12/2001 | Kojima et al. |
| 6,759,949 | B2 | 7/2004 | Miyahara |
| 7,567,687 | B2 | 7/2009 | Kudo |
| 8,049,609 | B2 | 11/2011 | Takahashi et al. |
| 8,981,966 | B2 | 3/2015 | Stein et al. |
| 8,988,525 | B2 | 3/2015 | Thompson et al. |
| 9,128,290 | B2 | 9/2015 | Kim |
| 9,230,178 | B2 | 1/2016 | Toyofuku |
| 10,175,112 | B1 | 1/2019 | Kuperman et al. |
| 2005/0084659 | A1* | 4/2005 | Dunkel ................. B32B 17/10 428/209 |
| 2008/0291276 | A1* | 11/2008 | Randler ................. B62D 1/28 348/149 |
| 2008/0297374 | A1 | 12/2008 | Usami |
| 2012/0038778 | A1 | 2/2012 | Klager et al. |
| 2012/0229643 | A1 | 9/2012 | Chidanand et al. |
| 2013/0211720 | A1* | 8/2013 | Niemz ................. G01C 21/20 701/538 |
| 2013/0235202 | A1 | 9/2013 | Nagaoka et al. |
| 2015/0019098 | A1 | 1/2015 | Schrabler et al. |
| 2015/0035962 | A1 | 2/2015 | Nagaoka et al. |
| 2015/0161796 | A1 | 6/2015 | Choi et al. |
| 2016/0152232 | A1 | 6/2016 | Takahashi et al. |
| 2017/0004365 | A1 | 1/2017 | Ono et al. |
| 2017/0197617 | A1 | 7/2017 | Penilla et al. |
| 2017/0349173 | A1 | 12/2017 | Nishiguchi et al. |
| 2017/0371336 | A1* | 12/2017 | Mei ................. G05D 1/0212 |
| 2018/0011485 | A1* | 1/2018 | Ferren ................. G05D 1/0022 |
| 2018/0029610 | A1 | 2/2018 | McNew |
| 2018/0134281 | A1 | 5/2018 | Newman et al. |
| 2018/0158335 | A1 | 6/2018 | Gee et al. |
| 2018/0204074 | A1 | 7/2018 | Kumano et al. |
| 2018/0234643 | A1 | 8/2018 | Kobayashi |
| 2018/0236985 | A1 | 8/2018 | Kim et al. |
| 2018/0236986 | A1 | 8/2018 | Kim et al. |
| 2019/0061753 | A1 | 2/2019 | Tanaka |
| 2019/0193787 | A1 | 6/2019 | Matsumoto |
| 2020/0019792 | A1 | 1/2020 | Sano et al. |

OTHER PUBLICATIONS

International Search Report for PCT Application No. PCT/US2019/027589 dated Jun. 21, 2019.

\* cited by examiner

PASSIVE INFRA-RED GUIDANCE SYSTEM

CROSS-REFERENCE TO RELATED APPLICATIONS

This application claims the benefit under 35 U.S.C. § 119(e) of U.S. Provisional Application No. 62/670,209, filed May 11, 2018, which is incorporated herein by reference in its entirety.

FIELD OF THE INVENTION

The present invention generally relates to augmenting the operation of autonomous vehicles, and more particularly relates to a system and method for locating a vehicle on a roadway, and adjusting the position and operation of the vehicle accordingly.

BACKGROUND OF THE INVENTION

Many companies are developing autonomous vehicles for commercial and personal use on existing roadways for a variety of applications, including but not limited to personal taxi services, delivery services, and the like. In accordance with the present invention, an autonomous vehicle is a vehicle capable of operating without a human driver. Such vehicles can be designed to operate utilizing an onboard computer and a system of sensors designed to drive, steer, and otherwise operate the vehicle in the same manner as if there were a human operator. It is envisioned that fleets of autonomous vehicles will soon be available, similar to a network of taxis, buses or delivery vans, whereby a user can request an autonomous vehicle to pick-up, transport and drop off passengers, or pick-up, transport, and deliver packages or the like, on demand. Alternatively, users can own an autonomous vehicle for personal use and use it for ordinary tasks, such as commuting to work, running errands, dropping the kids off at school, for travel, or the like.

Current autonomous vehicles in the development and testing stages generally utilize multiple systems to fully operate the vehicle without a human operator. First, a standard GPS system is used to plan a route for the vehicle. Taking into account the starting point and the destination for a trip, as well as other factors such as traffic conditions, road closures, weather conditions, preferred routes, toll roads, etc., the GPS system determines the best route for the vehicle to take. However, for safe and efficient operation, autonomous vehicles also need a system to recognize dynamic conditions along the route during operation of the vehicle. Such a system may be referred to as an augmented GPS system, which utilizes an array of technologies, such as cameras, sensors, radar, LIDAR and lasers to provide a three-dimensional view around the vehicle during operation. Such a system can keep track of other cars around the vehicle; detect obstacles or hazards around the car, in the road up ahead, or approaching the car from the front, rear, or sides; and determine the location of the edge of the road or travel lane, upcoming turns, hills or descents, and assess general road conditions ahead, behind and around the vehicle. Autonomous vehicles also require a centralized system within the car to process the information provided from the GPS system and augmented GPS system and utilize the processed information to operate the vehicle. Such commonly utilized systems generally include a Computer Area Network (CAN) bus in the vehicle to communicate with and coordinate operation of the GPS system, augmented GPS system and other autonomous vehicle operating systems.

Non-autonomous vehicles also utilize similar technology to back-up a human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is an object in the road ahead.

Until guidance systems on-board autonomous vehicles match or exceed the perception and analytical decision-making ability of human drivers, there will be numerous ongoing daily situations which will frustrate the ability of a full autonomous vehicle to properly and dynamically respond to, or react to, its surroundings. Moreover, until autonomous vehicles can safely rely upon existing operational systems and sensors for safe and efficient operation and eliminate essentially all risks, the public will continue to be hesitant to put full faith in true autonomous operation of such vehicles. Indeed, numerous "real-world" autonomous vehicular tests have resulted in guidance failures, accidents, etc., caused by guidance systems and sensors that have failed to adequately detect, recognize and/or react in a timely fashion due to challenging ambient conditions, and as a result, most autonomous vehicle testing is usually limited to warm, sunny climate areas.

While various optically-based automotive and/or autonomous guidance systems and sensors (e.g., video, LIDAR, etc.) are capable of performing well under ideal visual and ambient conditions, their capabilities can quickly diminish to unusable levels under adverse ambient conditions, such as during or shortly after rain, snowfall, fog, etc., or when it is dark outside and in low-lighted areas of the roadway. Additionally, while the existing level of "on-board" sensors, cameras, devices, and interfaces can alter an autonomous vehicle's driving characteristics to a limited degree (e.g., by braking for unexpected obstacles and/or other vehicles, or steering a vehicle if it drifts out of its lane, or adjusting the propulsion of the vehicle, etc.), there is currently an inherent extreme deficiency in giving autonomous vehicles the ability to react properly to harsh ambient conditions, such as fog, snow, heavy winds or extreme darkness, that can confuse or render useless many optically dependent sensors. Existing GPS navigation systems alone, and high-resolution digital maps cannot be absolutely relied upon, as their databases do not cover the majority of roadways, and are constantly becoming outdated. Accordingly, there is a need to improve upon existing optically-based guidance systems and sensors to ensure that operation of an autonomous vehicle is safe and efficient in all conditions.

Accordingly, there is a need for an improved system for the operation of autonomous vehicles, as well as manually driven vehicles, to continue to properly guide themselves during conditions on a roadway that overcomes the drawbacks and limitations of existing dynamic guidance systems. Further, there is a need for a system that utilizes infra-red detection and imaging with sensors that can assist in the safe and efficient operation of vehicles in response to unexpected and unpredicted situations or conditions on a roadway, and that will aid the vehicles in determining appropriate responsive actions in a quick and expeditious manner.

SUMMARY OF THE INVENTION

The present invention is generally directed to a passive infra-red guidance system for augmenting the operation of autonomous vehicles on a roadway. In accordance with embodiments of the present invention, the system provides a superior approach to assist a vehicle or driver in finding and determining the center point of an established travel lane when the roadway visibility, in general, is low, less than optimal, or otherwise compromised, and when the performance of other navigation systems may be diminished or ineffectual, and instantly respond to any detected guidance deviation.

Central to the operation of the system in accordance with the present invention is the use of at least one forward-looking passive infra-red (IR) image sensor mounted on a vehicle that is in operative communication with an image processor tied into the operational system of the vehicle, such as via a central CAN Bus unit in constant communication with various vehicle sensors, such as the IR sensors, for analysis and output processing, preferably immediately in real-time. In operation, the image processor analyzes the radiated thermal differences between a roadway's surface and areas adjacent to the roadway, which subsequently provides a data "picture" of where a roadway and/or a travel lane exists and ends. More particularly, the image processor, based on data measured by the at least one IR sensor, establishes a left edge line and a right edge line of the roadway, and then determines a centerline for a travel lane in which the vehicle is travelling. This information may be used to provide, for instance, a "heads up" display outlined on the windshield of a driven vehicle, or as a data input to the operating and/or navigation system of an autonomous vehicle. Though preferably used in autonomous vehicles, the system of the present invention can also be used in human-operated vehicles as an adjunct to a human driver, who, like the autonomous vehicle system, cannot properly identify the vehicle's position relative to the travel lane(s) on a snow- and/or ice-covered, or foggy, or poorly lit, or damaged roadway travel lane by optical means.

In an embodiment of the present invention, a method for centrally locating a vehicle within an established travel lane on a roadway comprises determining the left edge and the right edge of the roadway using thermal imaging, and then determining the centerline of the travel lane based on the determined left and right edges of the roadway. The method further comprises comparing the determined centerline of the travel lane with the actual position of the vehicle, and then identifying any adjustment for the vehicle's position based on the comparison.

In another embodiment of the present invention, a method for centrally locating a vehicle within a travel lane on a roadway comprises determining the left edge and the right edge of the roadway using a thermal imaging sensor assembly disposed on the vehicle, and then determining the centerline of the travel lane based on the determined left and right edges of the roadway. Depending on the curb-to-curb width divided by the typical travel lane width would allow the system to determine the number of travel lanes on an obstructed (e.g., snow-covered) roadway. The method further comprises comparing the determined centerline of the travel lane with the actual position of the vehicle, and then identifying any adjustment for the vehicle's position based on the comparison. The method further comprises initiating a response in the vehicle's operation based on the identified adjustment.

In another embodiment of the present invention, a system for centrally locating a vehicle within a travel lane on a roadway comprises a thermal imaging sensor assembly disposed on the vehicle and comprising at least one infra-red sensor for thermal imaging the roadway ahead of the vehicle. The system further comprises an image processor in operative communication with the thermal imaging sensor assembly for imaging the roadway on the left and right sides of the vehicle, respectively. More particularly, the image processor determines the centerline of the travel lane in the roadway based on thermal imaging signals received from the thermal imaging sensor assembly associated with the left and right edges of the roadway. The system further comprises a central vehicle control system in operative communication with the image processor for adjusting the vehicle's position within the travel lane using the vehicle's guidance system based on a comparison of the vehicle's actual position and the determined centerline of the travel lane.

In another embodiment, the image processor can identify a de facto travel lane "path" created by one or more vehicles that have recently travelled in front of the vehicle. More particularly, the system can identify, using at least one forward-looking passive infra-red sensor mounted to the vehicle, residual tire heat from tire tracks within the de facto travel lane, especially where there is a contrast between the thermal signature left by the tire tracks of preceding vehicles and the roadway and/or snow or other roadway surface coatings. The image processor can determine from the previously identified tire tracks an optimal travel "path" and determine a centerline for continued travel.

In another embodiment, the image processor can identify a de facto travel lane "path" created by one or more vehicles that have recently travelled in front of the vehicle by identifying, using at least one forward-looking passive infra-red sensor mounted to the vehicle, residual heat from a prior vehicle's tires having compressed water, snow, or ice during their rotation thus heating the area of their tire tracks creating a thermally contrasting de facto travel lane between the thermal signature left by the tire tracks of the preceding vehicle(s) and the undisturbed water, snow, ice or other roadway surface coatings. The image processor can determine from the previously identified tire tracks an optimal travel "path" and from these tracks, create a centerline for continued travel.

Unlike LIDAR or other "active" systems that continually radiate LASER or Radio Frequency energy and process the reflections of this energy, the Passive Infra-Red Guidance System in accordance with the present invention relies on passively detecting and processing contrasting thermal emissions around a vehicle.

In accordance with the present invention, said vehicle response can take the form of providing direct input to a vehicle's "Driver Assist" steering system, propulsion system, and/or automatic activation of a vehicle's braking system. The system is designed to be an adjunct to other sensors and guidance systems on a vehicle during times of challenging ambient conditions, and as such enhances an autonomous vehicle's autonomous guidance system.

The system in accordance with the present invention is capable of working with both manually driven, as well as autonomous vehicles.

Objects, features and advantages of the present invention will become apparent in light of the description of embodiments and features thereof, as enhanced by the accompanying figures.

DETAILED DESCRIPTION OF EMBODIMENTS OF THE INVENTION

Figure 1:
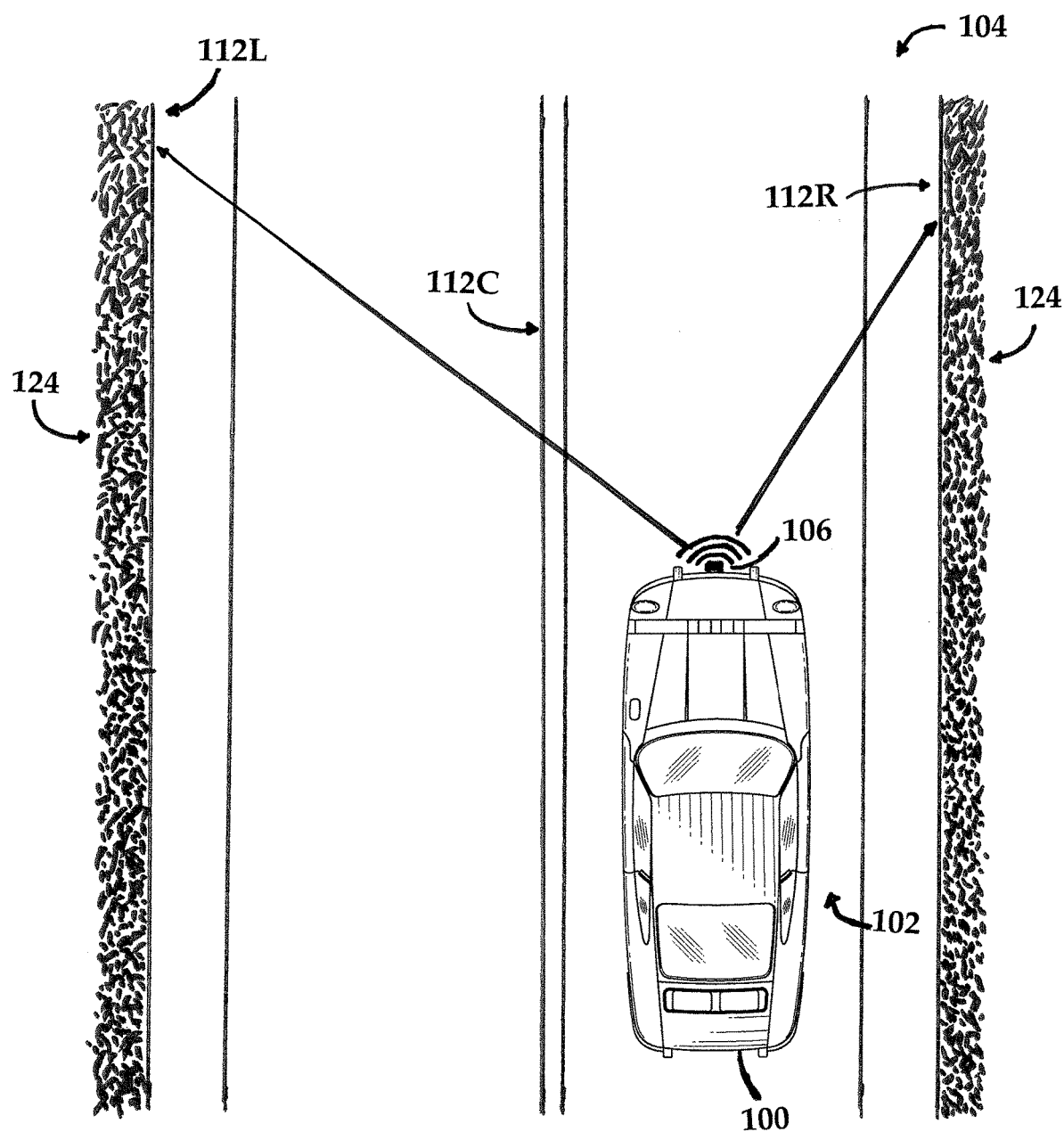
FIG. 1 provides an illustration of a vehicle on a roadway using the passive infra-red guidance system in accordance with an embodiment of the present invention to determine a centerline of the travel lane in which the vehicle is travelling.
Figure 2:
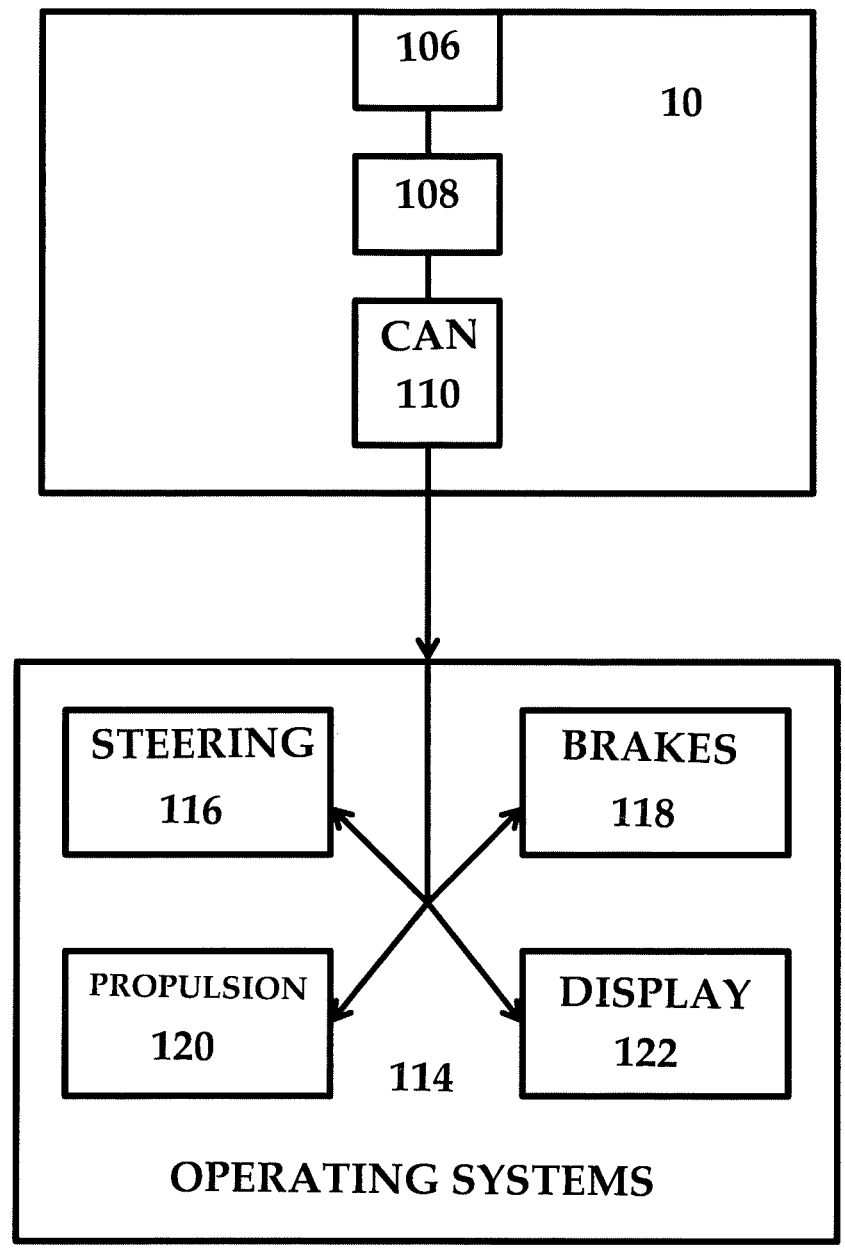
FIG. 2 provides a schematic generally illustrating the passive infra-red guidance system of FIG. 1.

Referring to FIGS. 1-2, a first operational mode of a passive infra-red guidance system in accordance with the present invention is illustrated. As illustrated in FIG. 1, a vehicle 100 generally travels within a travel lane 102 on a roadway 104. The system, generally designated by reference numeral 10, comprises at least one forward-looking passive IR imaging sensor or sensor array, generally designated as reference numeral 106, mounted on the vehicle 100 and directed in outwardly front of the vehicle 100 so that it can identify the edges of the roadway 104 or travel lane 102. In preferred embodiments of the present invention, as illustrated in FIG. 1, a single, forward-looking IR sensor 106 is mounted on the vehicle 100, preferably on the front of the vehicle 100, and more preferably centered on the vehicle 100 so that it can measure both the left and right sides of the roadway 104 in front of the vehicle 100 during travel. Such a forward-looking IR sensor 106 would generally cover a relatively close range in front of the vehicle 100—about 10 to 20 feet in front of the vehicle 100. Optimally, the IR sensor 106 has a relatively large pixel array, for example, about 640×480 or greater.

Figure 5:
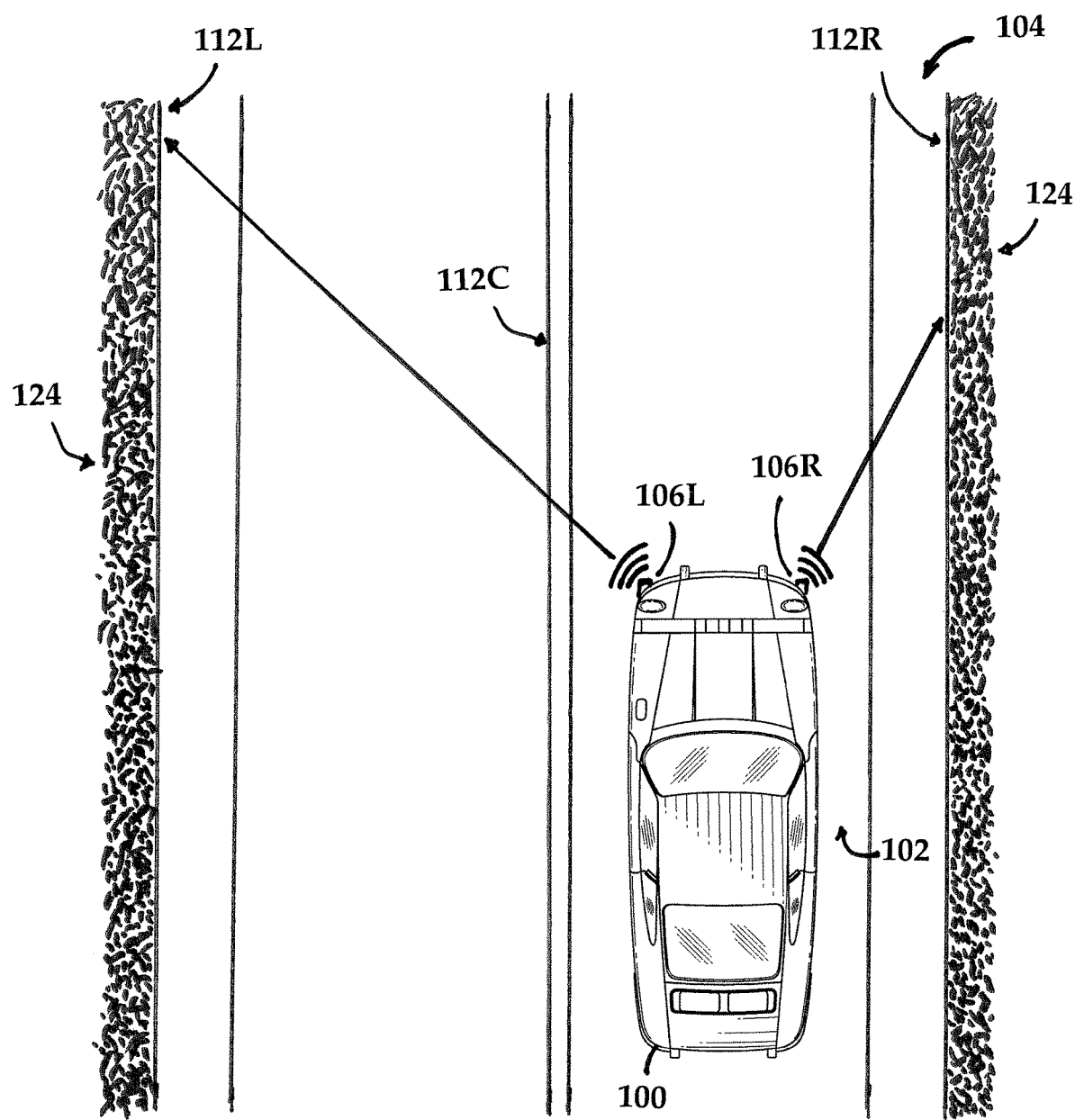
FIG. 5 provides an illustration of a vehicle on a roadway using an alternate embodiment of the system in accordance with the present invention to determine a centerline of the travel lane.

In alternate set-ups of the thermal imaging sensor assembly, multiple forward-looking IR sensors 106 can be mounted to the vehicle 100, preferably in over-lapping and/or redundant fashion. In an alternate embodiment of the present invention, as illustrated in FIG. 5, the vehicle 100 may include a dedicated right-side IR sensor 106R—directed toward the right edge of the roadway 104/travel lane 102 in a forward-looking manner—and a dedicated left-side IR sensor 106L—directed toward the left edge of the roadway 104/travel lane 102 in a forward-looking manner. In such an embodiment, the sensors 106R and 106L may be positioned on the front end of the vehicle 100 or alternately on the lateral sides of the vehicle 100, and be directed forwardly from the vehicle 100.

The following discussion of IR sensors in regards to the present invention could be a single sensor or a set of sensors operating to a collective end of detecting edges of the roadway 104/travel lane 102 through thermal imaging.

Figure 3:
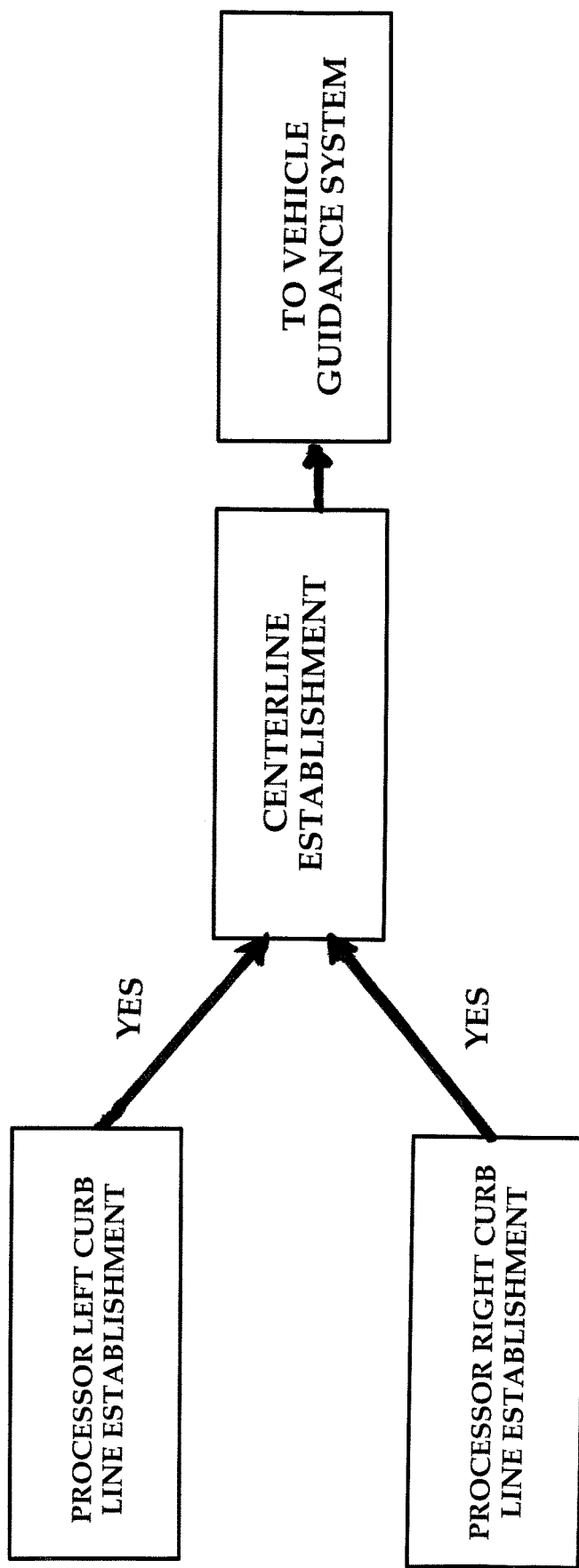
FIG. 3 provides a schematic generally illustrating an embodiment of a centerline determination method in accordance with the present invention in order to locate a vehicle on a roadway using curb line detection.
Figure 6:
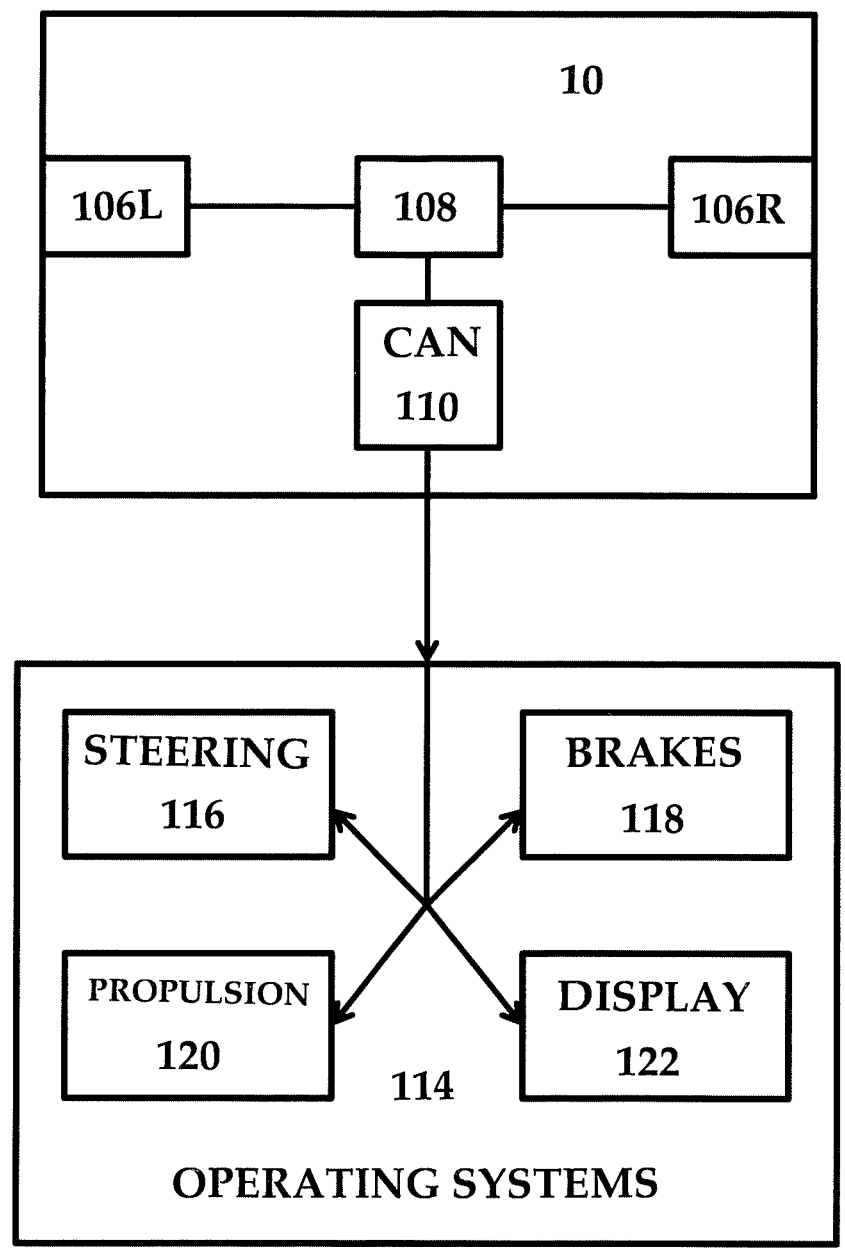
FIG. 6 provides a schematic generally illustrating the passive infra-red guidance system of FIG. 5.

Referring to FIGS. 2 and 6, the IR sensors 106 are in operative communication with an image processor 108, such as a video processor, tied into the operational system of the vehicle 100, such as via a central CAN Bus unit 110. Preferably, the CAN Bus 110 is in constant communication with various vehicle sensors, such as the IR sensors 106, for analysis and output processing, preferably immediately in real-time, based on the detected data. In operation, the system 10 determines the left edge and the right edge of the roadway 104 using thermal imaging. More particularly, the image processor 108 analyzes the thermal differences between a roadway's surface and areas adjacent to the roadway 104, as well as roadway features, such as embedded roadway lane or centerline reflectors, etc., and subsequently creates a data "picture" of where a roadway 104 and/or a travel lane 102 exists and ends. Referring to FIG. 3, the image processor 108 establishes a left curb line 112L and a right curb line 112R based on data received from the IR sensors 106.

As noted, each IR sensor 106 preferably has a relatively large pixel array—e.g., about 640×480 or greater. In operation, the image processor 108 focuses on a subset of the pixels measured by the sensors 106 to identify the left and right edges 112L and 112R of the roadway 104 or travel lane 102. For example, the image processor 108 can look at the left 200 pixels or so to identify the left edge 112L of the roadway 104/travel lane 102 and the right 200 pixels or so to identify the right edge 112R of the roadway 104/travel lane 102. Multiple processors may be used to analyze the sensor data more quickly and efficiently, and so that both the left and right edges 112L and 112R can be analyzed simultaneously.

In embodiments of the present invention using multiple IR sensors, such as a dedicated left and right IR sensor 106L and 106R, respectively, the left and right curb lines 112L and 112R will be established based on respective thermal measurements from the sensors 106L and 106R. In this regard, a single image processor 108 may be in operative communication with each of the left and right IR sensor 106L and 106R, or alternatively, a dedicated left image processor and a dedicated right image processor may be used to determine the left and right curb lines 112L and 112R, respectively.

The established curb line information is supplied by the image processor 108 to the CAN Bus 110, which establishes the centerline 112C for the roadway 104 or travel lane 102 depending on the calculated width of the roadway curbs. Upon establishing the centerline 112C, and comparing the vehicle's relative position to the calculated centerline 112C, the CAN Bus 110 supplies adjustment instructions to the vehicle operating and guidance systems, generally designated as reference numeral 114, if such adjustments are needed. Appropriate adjustments can generally include providing direct input to a vehicle's "Driver Assist" steering system 116, automatic activation of a vehicle's braking system 118, or adjustment of a vehicle's propulsion system 120. The information may also be provided as a data input to the navigation system of the autonomous vehicle 100.

As part of the centerline establishment step, the CAN Bus 110 can utilize information from a GPS or navigation system supplied with information about the roadway 104—such as, how many lanes the roadway 104 has; which lanes travel in which direction; whether the vehicle 100 is proximate to or nearing an exit, off ramp, or side street; how large the shoulder is—in order to accurately calculate the centerline 112C for a particular roadway 104 or travel lane 102. In this regard, upon establishment of a left curb line 112L and a right curb line 112R by the image processor 108, the CAN Bus 110 can extrapolate the proper position of the travel lane 102 for the vehicle 100 and the vehicle's relative actual position therein in order to determine if adjustments are needed to move the vehicle 100 left or right within the travel lane 102.

Figure 4:
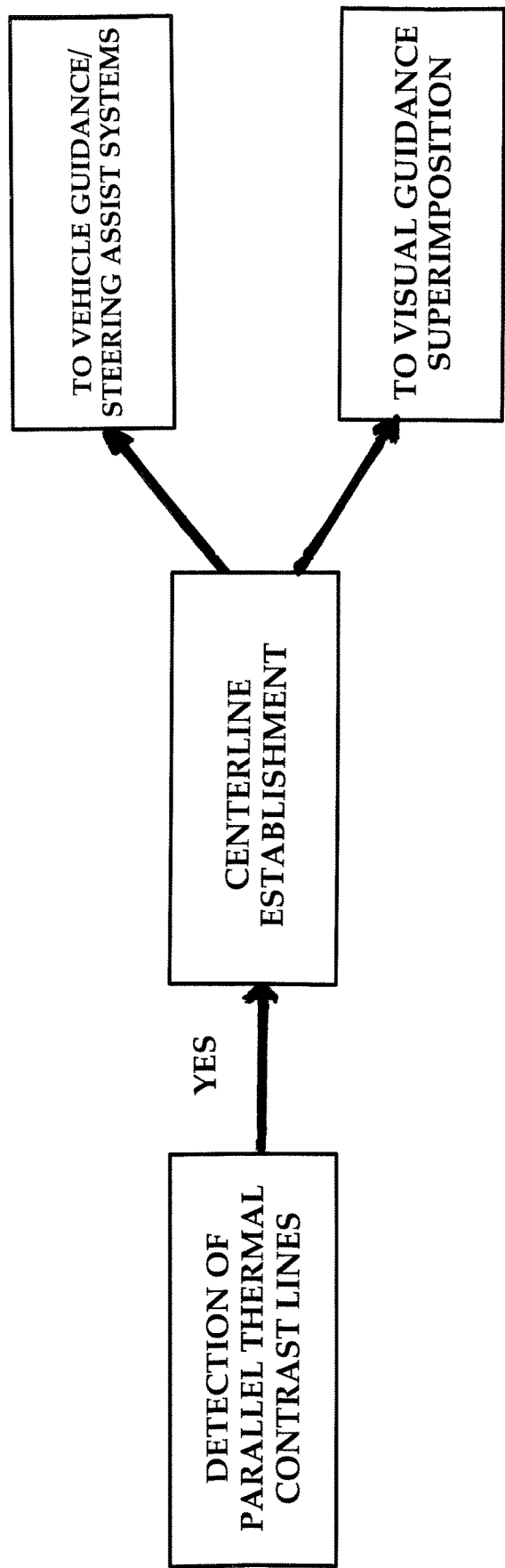
FIG. 4 provides a schematic of an alternate embodiment for locating the vehicle on a roadway using parallel image processors or algorithms.

While generally described herein for use in connection with autonomous—or driverless—vehicles, the system 10 of the present invention can also be used in driven vehicles, either having a quasi-autonomous mode or as a back-up redundancy to the human operator. For example, the centerline information and suggested corrective action may be provided, for instance, as a "heads up" display outline 122 on a driven vehicle 100, or as a video or graphic "see-through" OLED panel, or other display method, ideally sandwiched between the layers of the windshield, or as a data input to the navigation system of the vehicle 100, as illustrated in FIG. 4. The driver may be able to adjust the vehicle's position and speed manually, or in the alternative, the vehicle 100 may automatically adjust the vehicle's position and speed based on such continuous monitoring of the vehicle's position. The "see-through" OLED panel may also be used to display other vehicle-related information from other vehicle systems.

Typical roadway surface materials present a vastly different emitted thermal characteristic from that of adjacent non-roadway materials and surfaces, and thus present a contrasting thermal picture to an IR sensor 106. For example, during a snow event, an IR sensor 106 can make ready distinctions between the warmer pavement of the roadway 104 and the cooler dirt/grass/vegetation 124 situated on the side of the roadway 104. Alternately, when the roadway curbing is made of material such as granite that has a greater thermal mass than the roadway material, then this type of roadside curbing still thermally contrasts with the roadway surface, just in the opposite direction. It is important to note that in accordance with the present invention, it does not matter what the absolute thermal reading of any area or roadway actually is, but rather the system 10 is looking for thermal boundary differences, however subtle, to determine where the roadway edge is located. Of additional note, the image processor 108 is continually and dynamically optimizing the thermal contrast range of the displayed images by utilizing outside ambient temperature data readings from the CAN Bus 110. When this contrasting data is sent and processed by an image processor 108, definitive roadway edge lines 112L and 112R can be determined and used to further determine a centerline 112C of a roadway 104 or travel lane 102, or sent via a vehicle's CAN Bus 110 to be operatively connected to a vehicle's guidance system(s) 114 for autonomous steering, propulsion, and or braking adjustment, or, for example, to a heads-up display 122 superimposed on the windshield of a vehicle 100 for aiding a human driver.

Additionally, the application of typically used solid or liquid melting agents which are applied either before, during, or after snow/ice conditions will contrast with and further enhance the thermal signature of a roadway 104 relative to its adjacent areas 124, and also serve as a powerful de facto initial "marker trail" for the vehicle 100 to follow using the system 10 of the present invention.

Figure 7:
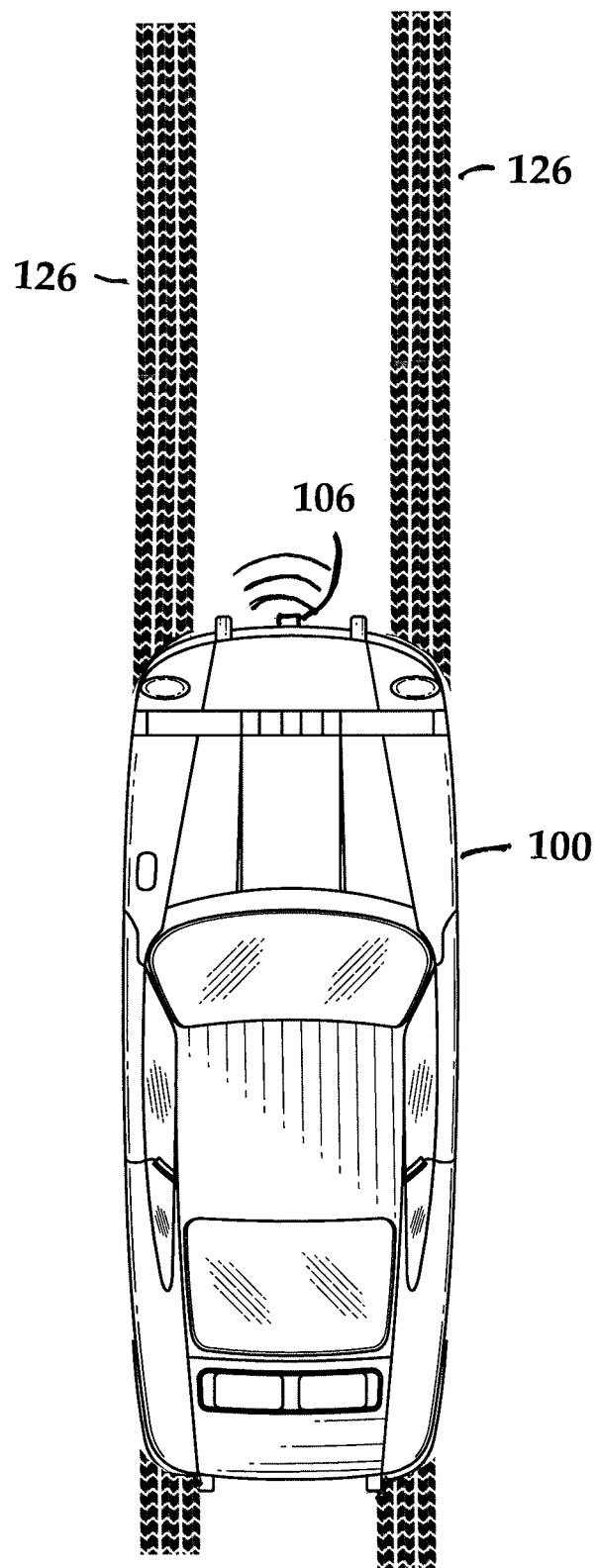
FIG. 7 provides an illustration of a vehicle on a roadway using the system in accordance with an alternate embodiment of the present invention to determine a path of travel for the vehicle based on thermal measurement from existing tire tracks of any preceding vehicle(s).

Referring to FIG. 7, an alternate embodiment of the present invention, especially useful in difficult road conditions, such as snow- or ice-covered roadways, is illustrated. FIG. 7 essentially illustrates what an IR sensor would see, as well as what would be displayed from the image processor 108, even though such tire tracks would generally be difficult or often impossible to detect in the visible wavelength spectrum as the tracks would typically be the same color as adjacent undisturbed snow, ice, or rain. In such an embodiment, the image processor 108 can supply a vehicle 100 with the ability to identify the ad-hoc "path" created by a previous vehicle's travel, or, as noted above, the prior application of melting agents if there are no prior tire tracks to create a target centerline of this path for an autonomous vehicle 100, or to guide a driver. Intrinsic friction created by the constant flexing of a tire's sidewalls and tread inherently creates heat and a subsequent rise in the internal air temperature of a vehicle's tires, which transfers through the tire's tread onto a dry, rain-covered, or snow- and/or ice-covered roadway surface creating a traceable historic path for a passive IR sensor 106 to detect. Additionally, the pressure of a previous vehicle's tires carrying the vehicle's substantial weight during the compacting of snow, ice, or rain under the tires creates additional pathway heating for the IR sensor 106 to detect.

As noted, such an embodiment is especially useful when a vehicle 100 is travelling on a snow-covered road. Traditional active optical visual sensing systems, such as LIDAR or video cameras, would have an extremely difficult, if not impossible, time differentiating shallow tread depths in the generally monochromatic surface reflectively of a snow-covered roadway 104. The system 10 of the present invention, by passively detecting thermal energy created in the tire tracks 126, can create an ad hoc centerline in the middle of the previous tire tracks 126, much as a human driver does in a roadway that has been travelled on, but not yet plowed. In the case of an autonomous vehicle 100, the output generated by the image processor 108 is sent to the vehicle's steering system 116 such that appropriate corrections can be made in the vehicle's operation. In the case of a driven vehicle 100, guidance information can be provided on a Heads-Up display 122 to assist the driver, such as a calculated and/or suggested ad hoc centerline projected on the windshield or left/right guidance arrows. With light snow cover and/or no recent vehicle travel (such that there are no prior tire tracks to follow), the system 10 can revert to measurement of the left and right curb lines 112L and 112R, such as discussed above. However, with heavy snow cover and/or recent travel on the roadway 104, such an alternate centerline determination method can be used for safe and efficient operation of the vehicle 100. Since the system 10 does not utilize visible light wavelengths, its operational ability is exactly the same day or night.

In alternate embodiments of the present invention, existing roadway markers or reflectors embedded in the roadway 104 either in the overall roadway centerline and/or the lane markers can also provide a contrasting thermal signature easily detected by the IR sensors 106. In operation, such thermal markers would exhibit a thermal signature that will be different from the surrounding roadway 104. A vehicle 100 can be aware of the general design of the roadway 104 via the navigation system so that the CAN Bus 110, upon receipt of left and right edge data based on measurements of the appropriate markers, can accurately establish a centerline 112C for the roadway 104 or a particular travel lane 102, and determine necessary adjustments accordingly.

The system 10 of the present invention is designed to be an adjunct to other sensors and guidance systems during times of challenging ambient conditions, and as such would enhance an autonomous vehicle's guidance system.

Unlike many optically-based guidance systems that have diminished effectiveness at night, especially in poorly light sections of the roadway 104, the system 10 of the present invention functions with equal effectiveness day or night, regardless of lighting conditions.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A method for centrally locating a vehicle on a roadway, said method comprising:
   identifying tire tracks of a previous vehicle's travel on the roadway using thermal imaging;
   determining a travel path based on the identified tire tracks;
   determining a target centerline of the travel path;
   comparing the determined target centerline of the travel path with an actual position of the vehicle; and
   identifying any adjustment for the vehicle's position based on the comparison;
   wherein the tire track identification comprises using a thermal imaging sensor assembly disposed on the vehicle;
   wherein the thermal imaging sensor assembly comprises at least one forward-looking infra-red imaging sensor mounted to the vehicle; and
   wherein the at least one infra-red sensor comprises:
   a left infra-red sensor mounted on the left side of the vehicle for thermal imaging tire tracks the left side of the vehicle; and
   a right infra-red sensor mounted on the right side of the vehicle for thermal imaging tire tracks on the right side of the vehicle.

2. The method according to claim 1, further comprising the step of adjusting the vehicle's position based on the identified adjustment using a vehicle's guidance system.

3. The method according to claim 2, wherein the adjustment of the vehicle's position comprises at least one of (i) providing input to the vehicle's steering system; (ii) activating the vehicle's braking system; and (iii) activating the vehicle's propulsion system.

4. The method according to claim 3, further comprising the step of displaying the identified adjustment on at least one of a heads-up display and a see-through OLED panel, either affixed to the interior of a windshield of the vehicle or sandwiched between layers of said windshield, associated with the vehicle.

5. The method according to claim 2, further comprising the step of displaying the identified adjustment on at least one of a heads-up display and a see-through OLED panel, either affixed to the interior of a windshield of the vehicle or sandwiched between layers of said windshield, associated with the vehicle.

6. The method according to claim 1, further comprising the step of displaying the identified adjustment on at least one of a heads-up display and a see-through OLED panel, either affixed to the interior of a windshield of the vehicle or sandwiched between layers of said windshield, associated with the vehicle.

7. A method for centrally locating a vehicle on a roadway, said method comprising:
   identifying tire tracks of a previous vehicle's travel on the roadway using thermal imaging;
   determining a travel path based on the identified tire tracks;
   determining a target centerline of the travel path;
   comparing the determined target centerline of the travel path with an actual position of the vehicle; and
   identifying any adjustment for the vehicle's position based on the comparison;
   wherein the tire track identification comprises identifying a thermal difference between a first thermal signature on a portion of the roadway traversed by the previous vehicle's tires and a second thermal signature representative of a portion of the roadway not traversed by the previous vehicle's tires.

8. The method according to claim 7, wherein the tire track identification comprises using a thermal imaging sensor assembly disposed on the vehicle.

9. The method according to claim 8, wherein the thermal imaging sensor assembly comprises at least one forward-looking infra-red imaging sensor mounted to the vehicle.

10. The method according to claim 7, further comprising the step of adjusting the vehicle's position based on the identified adjustment using a vehicle's guidance system.

11. The method according to claim 10, wherein the adjustment of the vehicle's position comprises at least one of (i) providing input to the vehicle's steering system; (ii) activating the vehicle's braking system; and (iii) activating the vehicle's propulsion system.

12. The method according to claim 11, further comprising the step of displaying the identified adjustment on at least one of a heads-up display and a see-through OLED panel, either affixed to the interior of a windshield of the vehicle or sandwiched between layers of said windshield, associated with the vehicle.

13. The method according to claim 10, further comprising the step of displaying the identified adjustment on at least one of a heads-up display and a see-through OLED panel, either affixed to the interior of a windshield of the vehicle or sandwiched between layers of said windshield, associated with the vehicle.

14. The method according to claim 7, further comprising the step of displaying the identified adjustment on at least one of a heads-up display and a see-through OLED panel, either affixed to the interior of a windshield of the vehicle or sandwiched between layers of said windshield, associated with the vehicle.

* * * * *